United States Patent [19]

Fuchs

[11] Patent Number: 5,593,257
[45] Date of Patent: Jan. 14, 1997

[54] APPARATUS FOR REMOVING HARDENED SUBSTANCES

[76] Inventor: Richard W. Fuchs, 17 Deerfield La., Simsbury, Conn. 06070

[21] Appl. No.: 334,278

[22] Filed: Nov. 4, 1994

[51] Int. Cl.⁶ ............................................. B27C 1/00
[52] U.S. Cl. ...................... 409/218; 144/218; 144/150; 407/38; 30/289
[58] Field of Search ............................ 409/218; 407/36, 407/38, 54; 144/150, 218, 219, 240; 173/216, 217; 30/276, 289

[56] References Cited

U.S. PATENT DOCUMENTS

| | | | |
|---|---|---|---|
| 991,094 | 5/1911 | Schneider | 173/216 X |
| 1,789,793 | 1/1931 | Wedhorn | 407/54 X |
| 2,930,290 | 3/1960 | Cooke | 90/12 R |
| 3,720,270 | 3/1973 | Pasquale | 173/217 X |
| 3,961,671 | 6/1976 | Adams et al. | 173/217 X |
| 4,188,723 | 2/1980 | Fuchs | 30/276 X |
| 5,193,943 | 3/1993 | Kim | 407/54 X |
| 5,267,593 | 12/1993 | Patterson | 144/240 X |

Primary Examiner—Rinaldi I. Rada
Assistant Examiner—Boyer Ashley
Attorney, Agent, or Firm—McCormick, Paulding & Huber

[57] ABSTRACT

An apparatus for removing hardened substances such as putty or the like from a window sash without removing the window sash from its frame and without requiring a separate external guide comprises a rotary cutter member with a cutting blade and a sleeve member including a guide ledge extending forwardly from a portion of the front face of the sleeve member to engage a surface of the window sash to position the cutting blade relative to the putty holding surface of the sash in the direction perpendicular to the putty holding surface. The apparatus may further include an extension member and a stabilizing member to be used when a hardened substance is to be removed from a sash having associated with it a storm window or the like that would otherwise interfere with an electric drill or other power source and prevent the cutter blade from reaching the putty.

5 Claims, 3 Drawing Sheets

APPARATUS FOR REMOVING HARDENED SUBSTANCES

FIELD OF THE INVENTION

The present invention relates to an apparatus for removing hardened substances, and more particularly relates to a simplified tool for removing hardened substances such as putty from a window sash.

BACKGROUND OF THE INVENTION

Repairing or replacing a house window typically involves a long and tedious process of manually removing hardened putty with a putty knife or chisel. A drawback to this approach is that chunks of the window sash are often removed because of human error. Alternatively, hardened putty is commonly removed by applying heat from a source such as a propane torch or a hot-air gun. Unfortunately, applying heat often results in burning the window sash or cracking the glass.

U.S. Pat. No. 4,188,723 shows an apparatus for removing hardened putty. The putty removal apparatus comprises a router-like cutting member including a carbide cutter which is attached by its shaft to the chuck of a high-speed electric drill. An adapter sleeve partially surrounds the cutter and is rotatably supported by the cutting member shaft. A front surface of the adapter sleeve serves as a guide to engage the face of the sash for forwardly positioning the cutter beyond the face of the window sash.

In addition to the adapter sleeve, a guide strip must be tacked to the face of the window to engage the adapter sleeve for locating and steadying the cutting member at or slightly above the putty holding surface of the sash, which extends perpendicular to the glass, thereby adding to the complexity of the putty removal tool and to the preparation time of the putty removal process.

An object of the present invention is to provide an apparatus for removing hardened substances which overcomes the above-mentioned drawbacks.

SUMMARY OF THE INVENTION

The present invention resides in an apparatus for removing hardened substances such as putty from a window sash while the sash, if desired, remains in place in the window frame. The apparatus comprises a rotary cutter member including a cutting head or blade and a shank to be rotated by a means hand held rotary powered drive means such as an electric drill or other medium high speed means. The apparatus further comprises a guide sleeve member including an axial bore which is mounted on the shank of the cutter member for providing a cylindrical sleeve extending axially over a portion of the cutting blade. The sleeve member further includes a substantially flat front face lying in a plane perpendicular to that of the shaft of the cutter member to engage a front surface of a window sash for accurately positioning the rotary cutter forwardly with respect to the front surface of the window sash and to the glass. In addition, the sleeve member includes a substantially flat guide ledge extending forwardly from a portion of the front face of the sleeve member to engage a surface of the window sash or the outer portion of the putty head to position the cutting head immediately adjacent to the putty holding surface of the sash, thereby accurately controlling the depth of the putty cut.

The apparatus may further include an extension member to allow use of the rotary cutter member and sleeve member when access to the sash is impeded by the presence of a storm window frame. Furthermore, the apparatus may include a stabilizing member to use with the extension member for improving stability and control of the apparatus during cutting. An advantage of the present invention is that no external or additional guides are required. Another advantage is that hardened substances can be removed without requiring the sash to be removed from its frame, or the building.

DETAILED DESCRIPTION OF THE PREFERRED EMBODIMENTS

Figure 1:
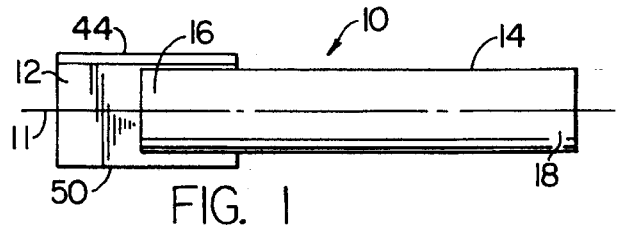
FIG. 1 is a side view of a cutter member used in an apparatus embodying the invention.
Figure 2:
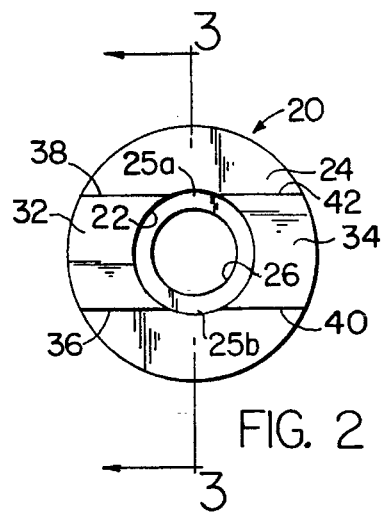
FIG. 2 is an end view of a guide sleeve member used in an apparatus embodying the invention.
Figure 3:
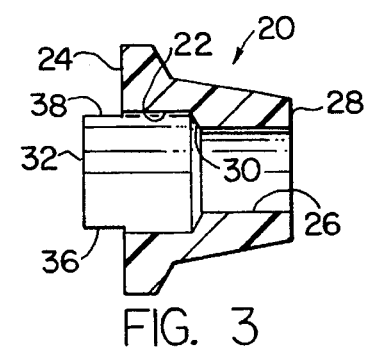
FIG. 3 is a vertical sectional view of the guide sleeve member taken on the line 3—3 of FIG. 2.

The present invention concerns an apparatus for removing hardened substances such as putty or the like from a window sash, its stiles or muntins, without damaging the sash and without requiring the removal of the sash from its supporting frame. A significant advantage of the present invention is the elimination of the need for an external guide, such as a guide tape, which adds to the complexity and preparation time of the putty removal process. FIGS. 1, 2 and 3 illustrate an apparatus comprising a preferred embodiment of the invention.

FIG. 1 illustrates a rotary cutter member 10 forming one component of the apparatus and having a longitudinal axis 11. This cutter member includes a sharpened cutting head or blade 12, preferably made as a generally rectangular piece of hard material such as tungsten carbide, and a shank 14 preferably made of steel. The shank has a forward end portion 16 carrying the blade and a rearward end portion 18 to be inserted into and rotated about the axis 11 by a hand held power source such as an electric drill or other rotary drive means. The blade 12 is preferably inserted in a slot provided at the forward end 16 of the shank and is permanently secured thereto by conventional techniques such as silver soldering.

Figure 2A:
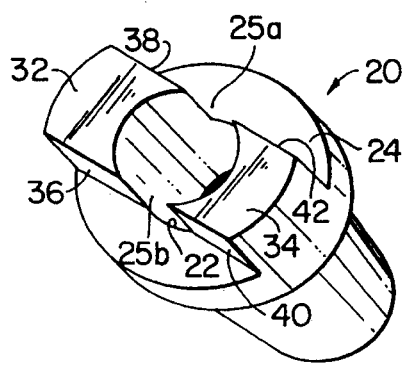
FIG. 2a is a perspective view of the guide sleeve member of FIG. 2.

FIGS. 2, 2a and 3 illustrate a sleeve member 20, constituting another component of the apparatus, for guiding the cutter member 10 over a strip or bead of putty to be removed from a window sash. The sleeve member is preferably a single piece of molded or machined plastic, such as nylon, delrin or celcon and is designed to be rotatably mounted on the shank 14 of the cutter member 10 by sliding it onto the shank 14.

The sleeve member 20 includes an enlarged diameter axial bore 22 extending rearwardly from a substantially flat front face 24 at the forward end of the sleeve member 20, and a bore 26 of smaller diameter extending axially forwardly from a rear face 28 on the rear end portion of the sleeve member. The enlarged diameter bore 22 and the smaller diameter bore 26 join one another within the sleeve member at a shoulder 30. Two projections 32 and 34 extend forwardly in an axial direction from the front face 24 on opposite sides of the bore 22 such that projection 32 provides flat ledges 36, 38 and projection 34 provides flat ledges 40, 42. Either the ledges 36 and 40 in combination with each other, or the ledges 38 and 42 in combination with each other, are engageable with a strip of putty or with a putty holding surface of the sash to position the cutting blade 12 of the cutter member 10 relative to the putty holding surface of the sash and in the direction perpendicular to that surface. That is, as shown in FIG. 2, the ledges 36 and 40 cooperate to form an essentially single ledge for engaging the sash or putty strip and the ledges 38 and 42 also cooperate to form another essentially single ledge. Because the sleeve member is rotatably mounted on the shank 14 of the cutter member 10, either the two ledges 36 and 40 or the two ledges 38 and 42 may be used to engage the sash or putty strip during a cutting operation. Further, this construction provides an opening above the blade vertically aligned with the point at which the blade cuts the putty, thereby allowing the removed material to escape from the sleeve member and preventing it from clogging in the sleeve member. In FIGS. 2 and 2a two openings in the sleeve are shown at 25a and 25b. When the two ledges 36 and 40 are brought into engagement with a sash or putty strip during a cutting operation, the opening 25a is the opening allowing for the escape of removed material. Alternately, when the two ledges 38 and 42 are brought into engagement with a sash or putty strip the opening 25b is the opening allowing for the escape of removed material.

Figure 4:
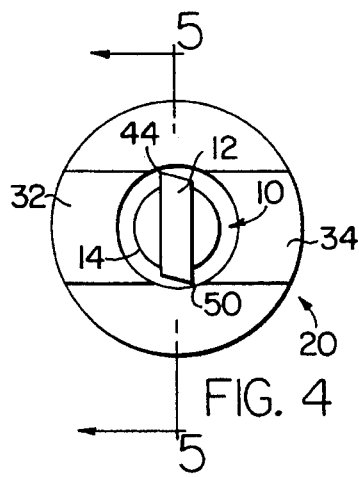
FIG. 4 is an end view of the cutter member and sleeve member of FIGS. 1 and 2 assembled with one another.
Figure 5:
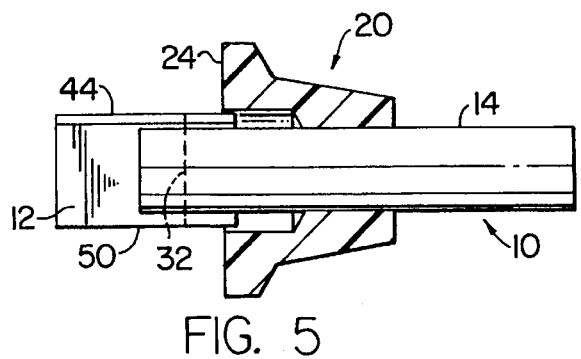
FIG. 5 is a vertical sectional view taken on the line 5—5 of FIG. 4.

FIGS. 4 and 5 illustrate the apparatus of FIGS. 1, 2, 2a and 3 with the sleeve member 20 assembled on the shank 14 of the cutter member 10. As best seen in FIG. 4, the cutting blade 12 of the cutter member 10 is parallelogram-shaped when viewed looking toward it and parallel to the central axis of the shaft 14. Axially extending cutting edges 44 and 50 of the blade 12 are sharp for rapidly cutting through hardened putty as the blade 12 rotates and is moved along a strip of putty.

Figure 6:
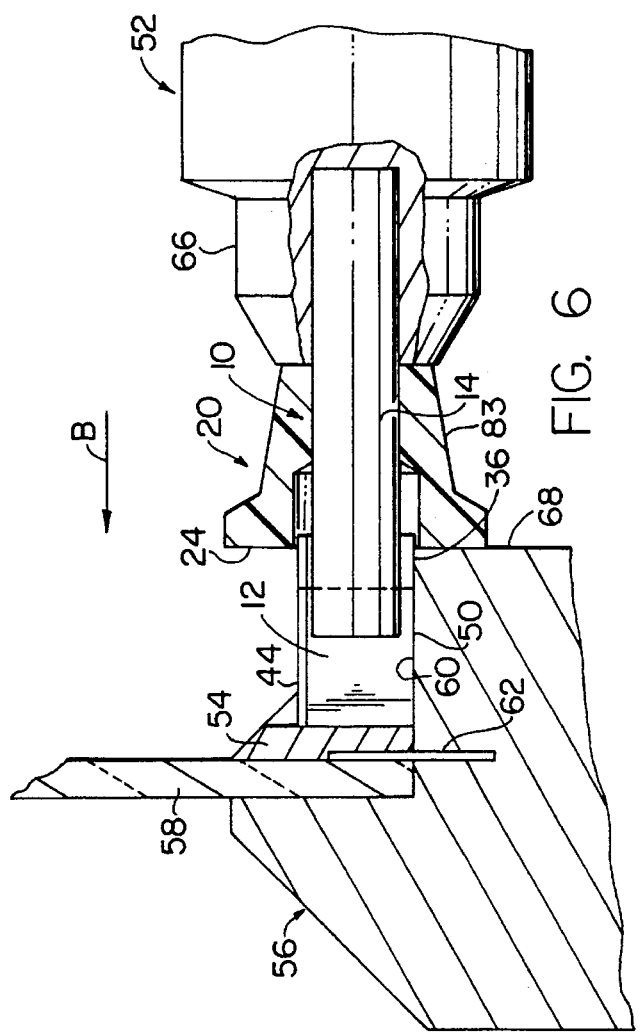
FIG. 6 is a partially sectional view and partially elevational view of the assembly of FIG. 5 shown in use with an electric drill and in the process of removing hardened putty from a window sash.

FIG. 6 illustrates the apparatus of FIGS. 4 and 5 with its cutter member mounted in the chuck 66 of a hand held electric drill 52 and positioned over a strip of putty 54 to be removed from a window sash 56. The putty strip extends in a direction perpendicular to the plane of the drawing and engages the adjacent pane 58 of glass and a putty holding surface 60 perpendicular to the glass.

The glass pane 58 is typically assembled with the sash by placing it into a pane opening of the sash and then anchoring it in place with metal glazing points 62, 62 (only one shown), or the like, driven into the sash at points spaced along the edges of the pane. Then strips of putty 54 are applied along the edges of the pane with each strip engaging the pane and the adjacent putty holding surface 60 of the sash with the putty covering the glazing points and being of generally triangular cross section.

The operation of the apparatus of the present invention will now be explained with respect to FIG. 6. The shank 14 of the cutter member 10, with the sleeve member 20 mounted thereon, is fixedly attached to a rotating means such as the chuck 66 of the illustrated electric drill 52. In doing this, the amount the cutting blade 12 can extend beyond a front surface 68 of the sash 56 is adjusted to suit the particular frame in question by varying how deeply the shank is inserted into the chuck. Preferably this adjustment is such that the maximum possible length of putty cut (which occurs when its sleeve front face 24 engages the sash front surface 68) falls just short of reaching the glazing points 62, thereby avoiding damage to the glazing members and to the window pane by the cutting blade 12. The depth of putty cut (that is, in the direction toward the putty holding surface 60 of the sash) is determined by how close the arc traversed by the rotating cutting edges 44 and 50 of FIG. 4 of the cutting blade extends beyond the plane formed by the two ledges 36 and 40 or the two ledges 38 and 42 of FIG. 2 (depending on which pair of ledges is used to engage the sash) of the sleeve member and the point at which the two ledges are brought into engagement with the sash or putty strip. The arc traversed by the rotating cutting edges 44 and 50 of FIG. 4 extends slightly through and beyond the plane formed by each pair of cooperating ledges. If the putty strip does not extend fully to the front face 68 of the sash, so that some of the putty holding surface 60 is not covered by the putty the selected pair of ledges 36 and 40 or 38 and 42 can be rested on and moved along the exposed portion of the surface 60. However, often the putty strip extends fully to the front face 68 of the sash, in which case when making a first one or more cutting passes along the length of a strip of putty the ledges 36 and 40 or 38 and 42 can first be engaged with and moved along the outer surface of the putty strip until the cutting blade reaches the putty holding surface 60, and then the ledges can be engaged with and moved along that surface for one or more final passes. Due to the path of the cutting edges extending beyond the plane of the used pair of ledges, in the final pass a small amount of sash material may be removed adjacent the surface 60 thereby assuring a clean surface for a future application of new putty.

As the electric drill 52 is moved toward the window sash in the direction given by the arrow B in FIG. 6, usually during the course of a number of cutting passes along the length of the putty strip, the front face 24 of the sleeve member 20 eventually engages the front surface 68 of the window sash, thereby fixing the final position of the sleeve member 20 with respect to the sash in the direction toward the glass pane.

For best results, the apparatus is preferably moved along a strip of putty in a direction opposite to the rotating movement of the cutting edges. Furthermore, the apparatus performs best when used with a high-speed electric drill rotating between 2000 to 4000 revolutions per minute, as slower speeds may cause the cutting member to "hop". A light grade oil, such as 5W-20, is preferably applied between the cutter member shank and sleeve member before use and after every several feet of putty removal to minimize friction and heat generation between the shank and the sleeve member.

Figure 7:
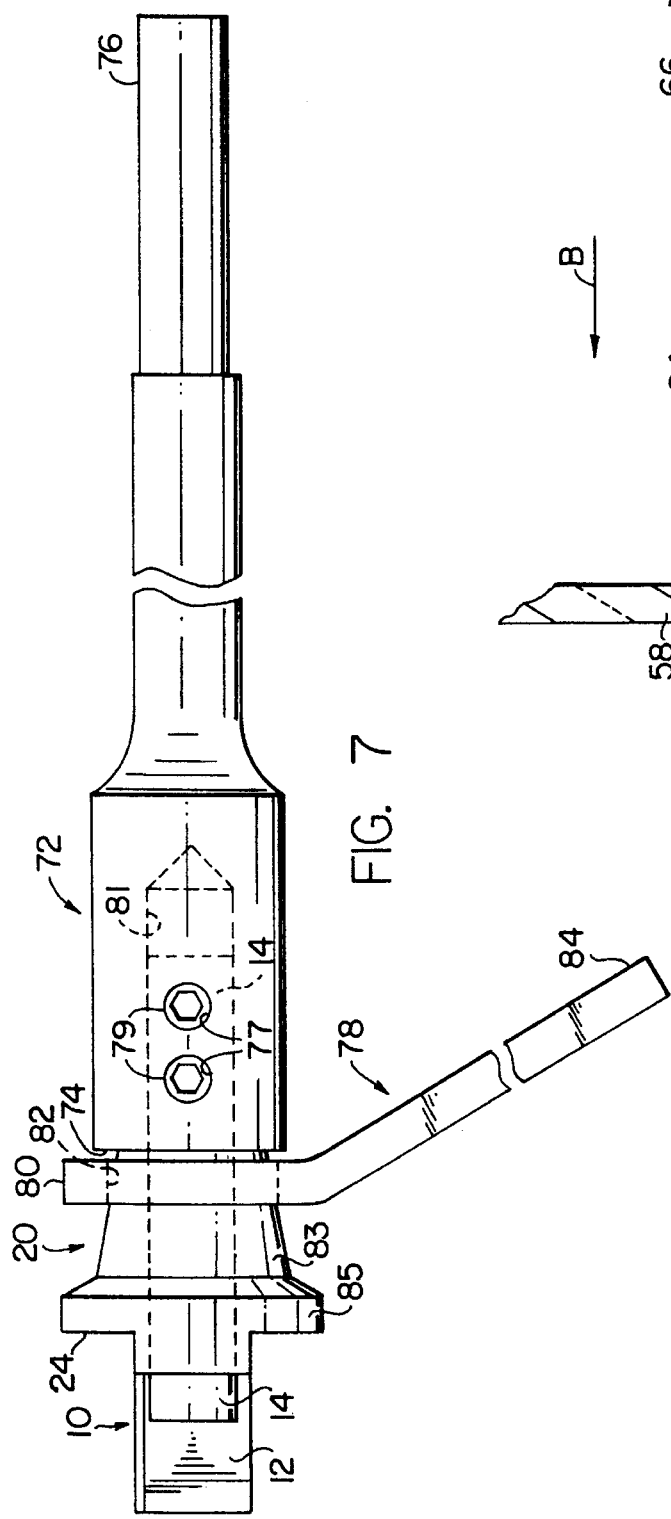
FIG. 7 is a view showing the apparatus of FIG. 5 in combination with an extension member and a stabilizing member.
Figure 8:
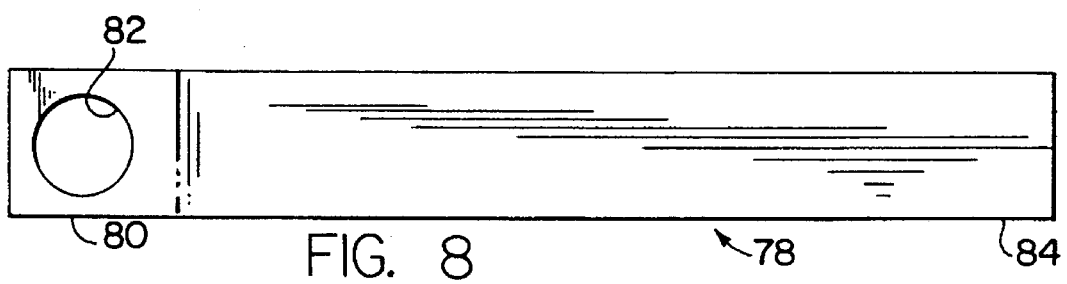
FIG. 8 is a plan view of the stabilizing member of FIG. 7.
Figure 9:
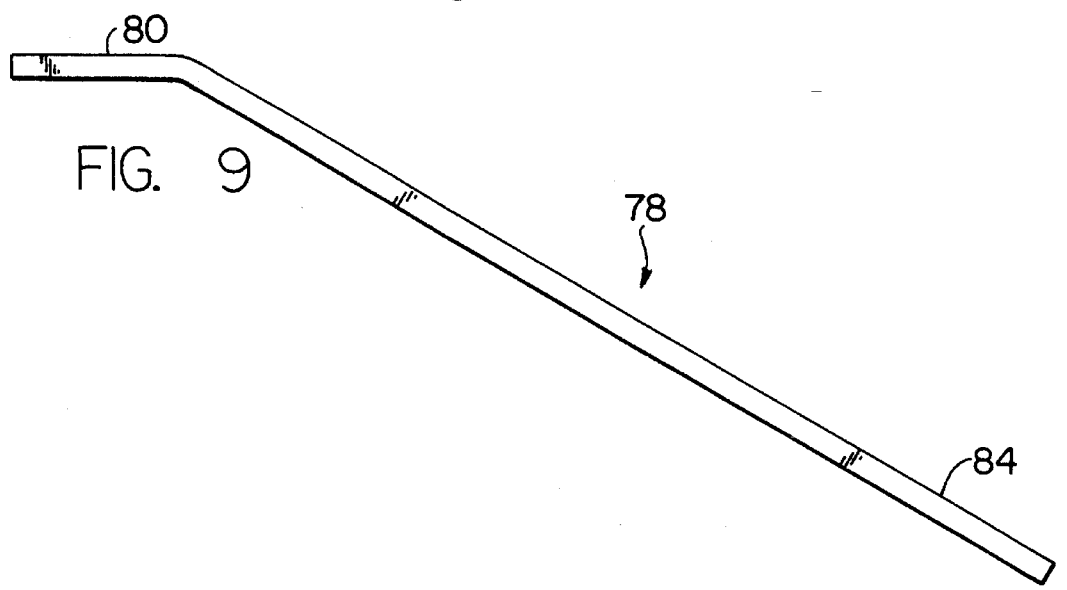
FIG. 9 is a side view of the stabilizing member of FIG. 7.

FIGS. 7, 8 and 9 illustrate a further development of the above-described apparatus making it better able to remove putty from a window sash having a storm window or other like obstruction associated with it which interferes with or prevents the above-described apparatus from accessing the putty to be removed.

Referring to FIG. 7, the illustrated apparatus includes a cutter number 10 and a sleeve member 20 as described above. The apparatus, however, further includes an extension member 72, to be interposed between the drill or other rotating means (not shown) and the cutter number 10 and sleeve member 20 to allow the drill to remain outside of the storm window and yet permit the cutter blade 12 to reach the putty strip. Specifically, the extension has a forward end portion 74 defining an axial bore 81 therein for receiving and fixedly attaching the shaft 14 of the cutter member to the extension member, and a rearward end portion 76 for fixed attachment to the drill. The extension member has two threaded holes 77, 77 receiving set screws 79, 79 to firmly engage and fix the shaft 14 of the cutter member to the extension member. Of course, other equivalent attaching techniques may be used.

The further development of FIGS. 7, 8 and 9 also preferably includes a stabilizing member 78 allowing the operator to better control the movement of the cutter member over a strip of putty when the extension member is employed. The stabilizing member includes a fitting end portion 80 having a substantially round hole 82, as shown in FIG. 8, to rotatably receive the outer surface of the rear portion 83 of the sleeve member 20 with the end portion 80 being axially positioned between the forwardly facing forward end face 74 of the extension member 72 and the radially enlarged forward portion 85 of sleeve member 20, as shown in FIG. 7. The forward end face 74, as shown in FIG. 7, is located immediately adjacent the rear end of the sleeve member 20, and is of larger diameter than the rear end of the sleeve member 20, so as to limit the rearward movement of the sleeve member 20 and stabilizing member 78 relative to the shank 14, and so as to retain the stabilizing member on the rear portion 83 of the sleeve member when the sleeve member engages the end face 74. The rear portion of the sleeve member is tapered, as seen in FIGS. 3 and 7, so that the stabilizing member can move a substantial amount relative to the sleeve member in a generally universal manner to allow the operator to bring the stabilizing member to the position best suited to the situation at hand. The stabilizing member also includes an operator gripping end portion or handle 84 extending rearwardly and radially away from the sleeve member to allow an operator by grasping and manipulating the handle 84 to better control the positioning of the sleeve member 20 and of the cutter member 10.

In the above description and in the claims which follow, when the apparatus in question is positioned with the cutter member 10 oriented as shown in FIG. 1, the left end of the cutter member and any other part of the apparatus is taken to be the forward or front end of the part in question and the right end is taken to be the rear end of the part in question, the term "axially" is taken to refer to a direction along or parallel to the axis 11, the term "radially" is taken to refer to a direction extending radially of the axis 11, the term "forwardly" is taken to refer to a direction moving from right to left along or parallel to the axis 11, and the term "rearwardly" is taken to refer to movement from left to right along or parallel to the axis 11.

It is to be understood that numerous modifications can be made without departing from the spirit and scope of the invention; and accordingly, the invention has been described through preferred embodiments by way of illustration rather than limitation.

I claim:

1. An apparatus for connection to and use with a hand held powered rotary drive means for removing hardened putty from a window sash having a front surface and a putty holding surface extending rearwardly from and perpendicular to said front surface and holding a putty strip, said apparatus comprising:

a rotary cutter member having a longitudinal axis and including a cutting blade and a shank to be connected to and rotated about said longitudinal axis by said rotary drive means; and a sleeve member including an axial bore, said shank of said cutter member being rotatably received in said bore and said sleeve member extending axially along a portion of said cutting blade, said sleeve member having a substantially flat front face perpendicular to said longitudinal axis of said cutter member to engage said front surface of a window sash to accurately position the rotary cutter member forwardly with respect to said front surface, said sleeve member further having at least one substantially flat guide ledge extending forwardly from said front face to engage said putty holding surface or said putty strip to position said cutting blade relative to said putty holding surface in a direction perpendicular to said putty holding surface, said cutting blade having at least one straight cutting edge extending parallel to and spaced radially from said longitudinal axis so as to trace a cylindrical path as said cutter member is rotated about said longitudinal axis, and said at least one guide ledge extending from the front face of the sleeve member is a composite ledge made up of a first pair of two separate aligned ledges located in a first common plane perpendicular to said front face and which two separate aligned ledges are spaced from one another by a gap and are so positioned relative to said longitudinal axis that a part of said cylindrical path of said cutting edge is located within said gap and another part of said cylindrical path of said cutting edge protrudes from said gap through and beyond said first common plane of said first pair of aligned ledges.

2. An apparatus for removing hardened substances according to claim 1, wherein said sleeve member further includes another composite guide ledge made up of a second pair of two aligned ledges located in a second common plane generally parallel to said first common plane so as to face in a direction opposite to that faced by said first pair of aligned ledges and which second pair of aligned ledges are spaced from one another by said gap and are so positioned relative to said longitudinal axis that yet another part of said cylindrical path of said cutting edge protrudes from said gap through and beyond said second common plane of said second pair of aligned ledges.

3. An apparatus for connection to and use with a hand held powered rotary drive means for removing hardened putty from a window sash having a front surface and a putty holding surface extending rearwardly from and perpendicular to said front surface and holding a putty strip, said apparatus comprising:

a rotary cutter member having a longitudinal axis and including a cutting blade and a shank to be connected to and rotated about said longitudinal axis by said rotary drive means;

a sleeve member including an axial bore, said shank of said cutter member being rotatably received in said bore and said sleeve member extending axially along a portion of said cutting blade, said sleeve member having a substantially flat front face perpendicular to said longitudinal axis of said cutter member to engage said front surface of a window sash to accurately position the rotary cutter member forwardly with respect to said front surface, said sleeve member further having at least one substantially flat guide ledge extending forwardly from said front face to engage said putty holding surface or said putty strip to position said cutting blade relative to said putty holding surface in a direction perpendicular to said putty holding surface, said sleeve member having a rear end and a rear portion extending forwardly from said rear end and said shank extending rearwardly of said rear end of said sleeve member so as to be connectable to said rotary drive means at a point spaced rearwardly of said rear end of said sleeve member;

a stabilizing member for stabilizing said cutter member, said stabilizing member including a fitting end portion defining a substantially round hole to rotatably receive said rear portion of said sleeve member and an operator grippable end portion extending generally rearwardly and radially outwardly from said fitting end portion; and means providing a forwardly facing face axially fixed relative to said cutter member shank adjacent said rear end of said sleeve member to limit rearward movement of said sleeve member relative to said shank, said forwardly facing face having a diameter larger than said diameter of said rear end portion of said sleeve member so as to retain said stabilizing member on said sleeve member when said rear end of said sleeve member is in engagement with said forwardly facing face.

4. An apparatus as defined in claim 3, wherein said rear portion of said sleeve member is tapered so as to allow universal movement between said stabilizing member and said sleeve member.

5. An apparatus as defined in claim 3, further including means for adjustably positioning said forwardly facing face at different axial spacings from said cutting blade of said cutter member.

* * * * *